United States Patent
Cloud

[15] 3,683,729
[45] Aug. 15, 1972

[54] METHOD OF CUTTING ARTICLES FROM A STRIP

[72] Inventor: Charles E. Cloud, Wilmette, Ill.

[73] Assignee: Cloud Machine Corporation, Skokie, Ill.

[22] Filed: Dec. 21, 1970

[21] Appl. No.: 100,089

Related U.S. Application Data

[60] Division of Ser. No. 852,518, May 7, 1969, which is a continuation-in-part of Ser. No. 504,709, Oct. 24, 1965, abandoned.

[52] U.S. Cl. ........................... 83/24, 83/23, 83/88, 83/152, 83/154, 83/345, 83/925 R, 53/180, 221/71

[51] Int. Cl. .....B65h 29/24, B65h 34/08, B65h 29/66

[58] Field of Search........83/345, 310, 322, 323, 324, 83/152, 154, 98, 99, 100, 423, 88, 23, 24, 217, 94, 925; 22/30, 71; 53/180

[56] References Cited

UNITED STATES PATENTS

| | | | |
|---|---|---|---|
| 2,888,787 | 6/1959 | Cloud | 53/180 X |
| 2,522,682 | 9/1950 | Lewis | 53/180 X |
| 2,784,540 | 3/1957 | Jarund | 53/180 |
| 2,831,684 | 4/1958 | Cundall | 83/154 X |
| 2,601,376 | 6/1952 | Eaton | 53/180 X |
| 3,330,092 | 7/1967 | Hill | 83/152 X |
| 2,759,543 | 8/1956 | Conti | 83/152 X |
| 2,383,523 | 8/1945 | Thoraburgh | 83/323 X |
| 3,338,021 | 8/1967 | Liedtke | 53/180 X |

*Primary Examiner*—James M. Meister
*Attorney*—Hill, Sherman, Meroni, Gross & Simpson

[57] ABSTRACT

A method of cutting interconnected packages or articles from a continuous strip is characterized by the step of restraining and controlling the movement of a leading one of the articles or packages while a trailing edge of that package is severed from the strip and then releasing that package in a controlled manner to deposit the same onto an underlying article receiving surface with one side of that package oriented relative to similar sides of previously severed packages in a preselected manner. The underlying surface may include a conveyor operated at a speed controlled to shingle-stack the severed packages for facilitating further handling.

14 Claims, 19 Drawing Figures

METHOD OF CUTTING ARTICLES FROM A STRIP

CROSS REFERENCE TO RELATED APPLICATIONS

This application is a division of my co-pending application, Ser. No. 852,518, filed May 7, 1969, which application is a continuation-in-part of my application U.S. Ser. No. 504,709, filed Oct. 24, 1965, now abandoned.

BACKGROUND OF THE INVENTION

1. Field of the Invention

This invention relates to a packaging machine for continuously forming a series of filled packages from a continuous length of flexible material. The material may be any flexible medium, such as a plastic, paper, cloth, or in short, any material that will conform to the hereinafter described requirements. If desired, the strip material may be plastic coated where the pockets are to be formed by a heat sealing operation.

2. Description of the Prior Art

Exemplary of prior art devices is Charles E. Cloud, et al. U.S. Pat. No. 3,344,576, issued on Oct. 3, 1967 and assigned on its face to Cloud Machine Corporation, a corporation of Delaware.

SUMMARY OF THE INVENTION

The primary object of the invention is to provide an improved machine for high-speed production of filled packages.

An object of the invention is to provide such a machine in which improved provision and fewer parts are required in forming individual packages from a strip of filled and sealed pockets of the product.

Important features of the present invention relate to an improved apparatus for high-speed manufacture of filled packages from continuous strip material, which apparatus has improved means for filling the strip pockets with the desired amount of material such as sugar following the formation of the spaced pockets along the length of the strip of material, and means for sealing open ends of the pockets and improved means for then severing the thus filled packages from the continuous strip of material.

In accomplishing these objects a packaging machine which forms a continuous strip of packages having transverse seals is provided with an indexing wheel for supporting the strip of packages at the transverse seals and a cutting wheel having a plurality of blades for intermeshing with the index wheel and for slicing said strip of packages into individual packages.

Further objects and advantages will appear from the detailed description and claims to follow, particularly in connection with the accompanying drawings, which illustrate more or less diagrammatically, and by way of example and not of limitation, single strip type machines for producing filled packages.

BRIEF DESCRIPTION OF THE DRAWINGS

FIGS. 10–13 illustrate a modified machine wherein

DETAILED DESCRIPTION OF THE PREFERRED EMBODIMENT

Although the invention will be described in conjunction with a specific embodiment which forms packages from a single strip for definiteness of disclosure, it should be understood that the principles of the invention may be employed in other machines, for example, one using two strips to form the packages.

Figure 1:
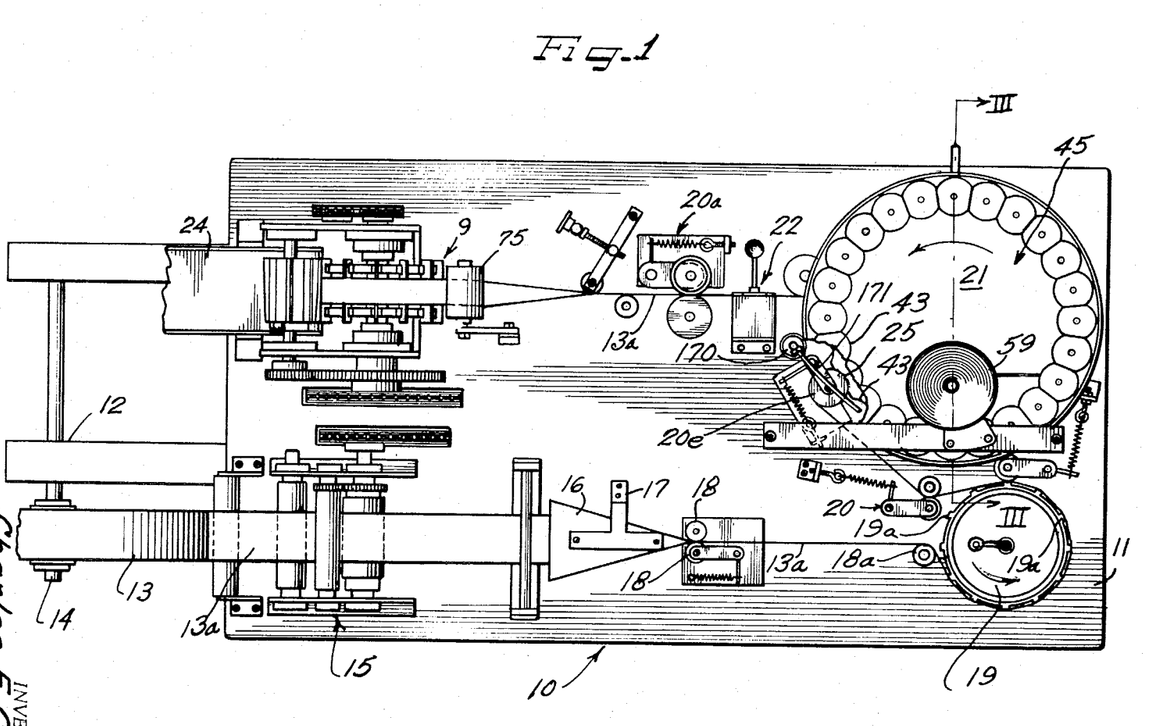
FIG. 1 is a top plan view and FIG. 2 is a side elevation of a packaging machine constructed in accordance with the principles of the present invention.

Referring to FIG. 1 there is depicted a packaging machine generally indicated by the numeral 10. The machine 10 has a horizontal base 11 supporting various components. Mounted adjacent to the base 11 is means comprising a roll stand 12 for supporting a roll of packaging material 13. The roll 13 is supported on an arbor 14 in such a way that when a strip 13a is unrolled therefrom it is disposed generally in a vertical plane and is turned to a generally horizontal plane over the base 11. The strip 13a may be of any suitable type and can be coated on at least one side with a sealable material such as plastic or other suitable adhesive.

It is contemplated that the strip be either pre-printed or a printing device 15 such as illustrated in FIG. 1 may be employed downstream from the roll 13. The strip 13a may be suitably printed by moving the same through the printing device. Downstream from the roll 13, the strip 13a is fed through and driven by the suitable printing device.

A suitable paper plow 16, supported on a paper plow bracket 17, is disposed forwardly of the printing device 15 for folding the strip 13a. When the strip 13a is folded, the fold is disposed at the bottom of the strip as the strip then assumes generally a V-shape in transverse cross-section.

In order to further prepare the strip 13a so that filled packages may be formed, a pair of guide rollers 18, 18, disposed on the downstream side of the plow receive the folded strip 13a therebetween and guide the strip to a vertical sealer 19 via a turning roller 18a. The strip 13a is adapted to be pulled and moved through an arc as the vertical sealer is driven in the direction indicated by the arrow, contemporaneously with the capstan and drive rolls 20. The vertical sealer has a series of vertically extending circumferentially spaced heated lands 19a which are provided to form longitudinally spaced vertically extending heat seals in the strip. After the strip has been heat sealed in the manner described, pockets are formed and disposed between a pair of pocket side walls.

The strip having pockets formed therealong is then moved through a filling station generally indicated at 21 and constructed in accordance with one feature of the present invention for inserting a preselected quantity of any suitable material in the individual pockets of strip 13a. For example, each pocket may be filled with a desired amount of sugar, salt or other material. Where material such as sugar is to be placed in the pockets, the pockets are filled in a pouring operation as illustrated. The filling station includes a rotating filling wheel 45 (FIG. 1) which rotates about its center as indicated by the arrow. Thereafter, the strip is moved through a top heat sealer 22 which provides a horizontal heat seal to close each pocket and captivate the inserted product therein, and a second capstan.

The generally vertically oriented strip 13a is then turned so as to again move in a generally horizontal plane into a combination indexer and slicer 9, constructed in accordance with another feature of the present invention.

A more detailed discussion of some of the parts of the machine 10 which do not, in themselves, constitute the present invention may be found in my application for U.S. Letters Patent, Ser. No. 290,725, entitled "METHOD AND APPARATUS FOR PACKAGING" which was filed on June 26, 1963, and over which the present application constitutes an inventive advance.

Figure 2:
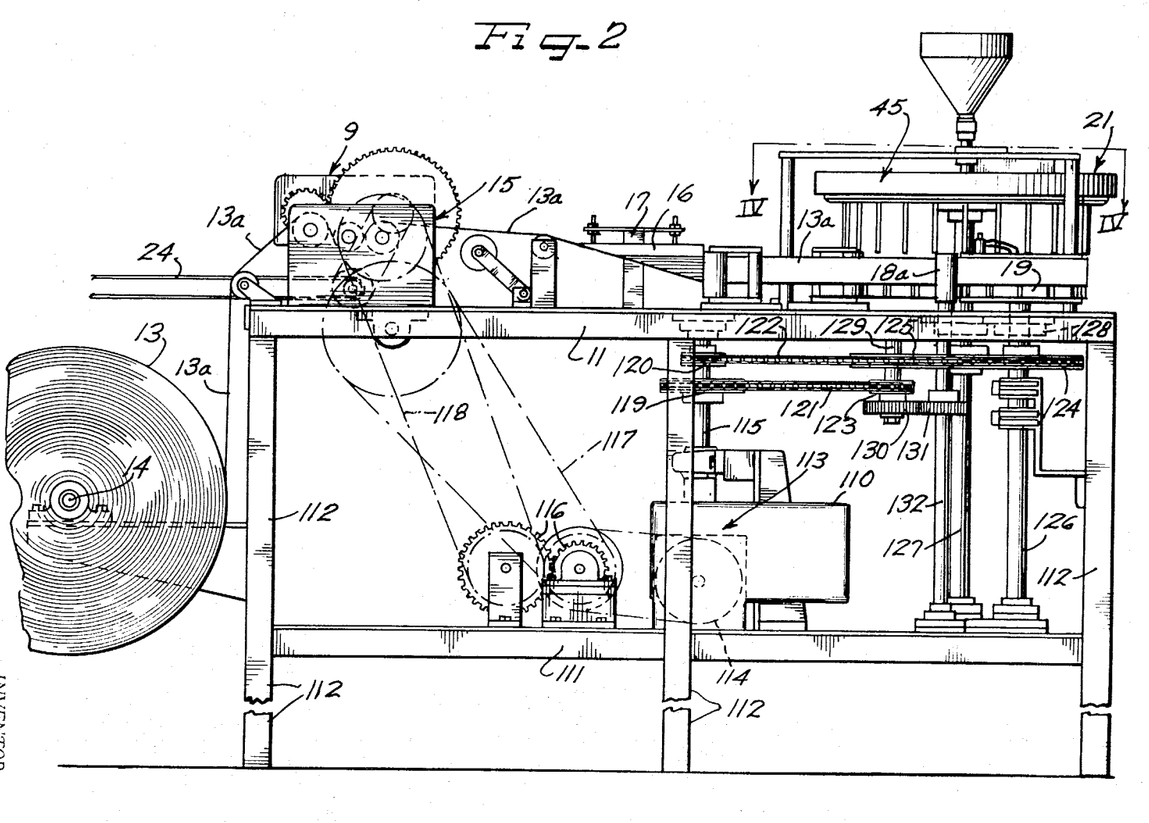

The drive of the machine 10 is best depicted in FIG. 2. The prime mover includes a variable speed electric motor 110. The electric motor 110 is mounted on a second base 111 which is supported parallel to and below the base 11 by a plurality of standards 112. The motor 110 drives a transmission 113 from which two power take-offs are provided, a horizontal chain-belt take-off 114 and a vertical axial take-off 115. The chain-belt power take-off 114 drives a pair of gear-intermeshed vertical chain belt pulleys 116 each of which provides via a chain belt 117, 118 the power for the printing assembly 15 and the index and slicer mechanism 9, respectively.

The vertical axis power-take-off 115 drives the capstan roller drive 20a directly and has two chain belt pulleys 119 and 120 for driving, respectively, via chain belts 121 and 122, the pulleys 123, 124 and 125. Chain 122 encircles three pulleys, the driving pulley 120 and two driven pulleys 124 and 125. Each of the driven pulleys 124 and 125 are keyed to vertical shafts 126 and 127, respectively. These shafts are mounted in bearing sleeves 128 for passing through the base 11. Above the base 11, shaft 126 is keyed to vertical sealer 19 for driving the sealer 19, and shaft 127 is keyed to the filling station 21 for driving it. The pulley 123 is keyed to another shaft 129 for driving a gear 130 which meshes with and drives a second gear 131 which is keyed for rotating a shaft 132. The shaft 132 passes through the base 11 and drives the capstan and drive rolls 20.

Figure 3:
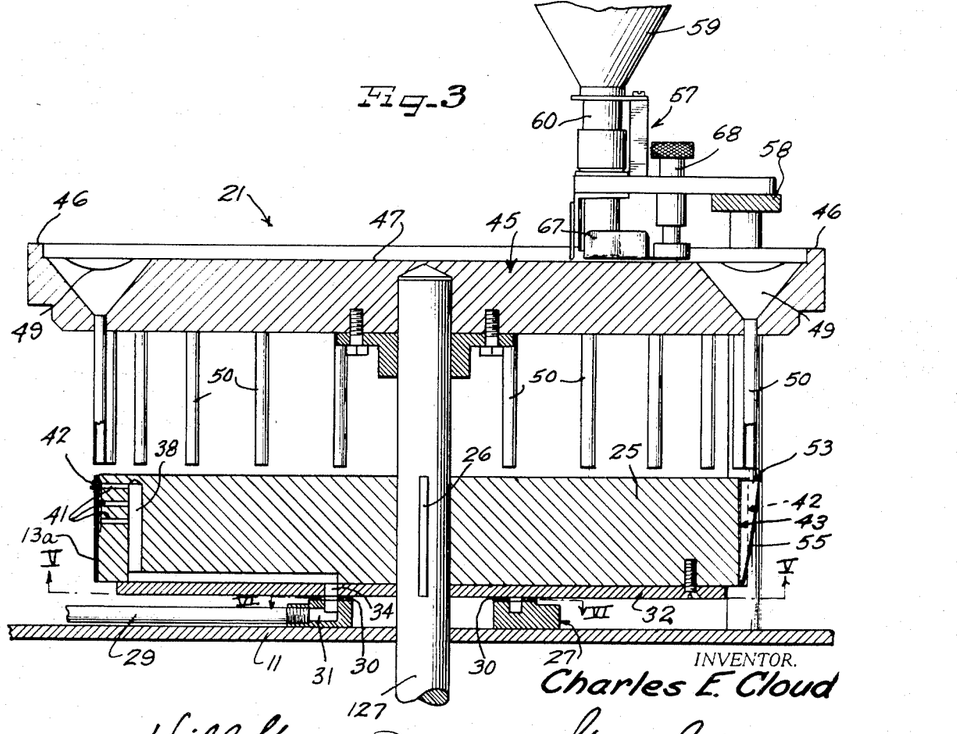
FIG. 3 is a fragmentary side elevation, partly in section of a part of the machine as seen from the line III—III in FIG. 1.
Figure 4:
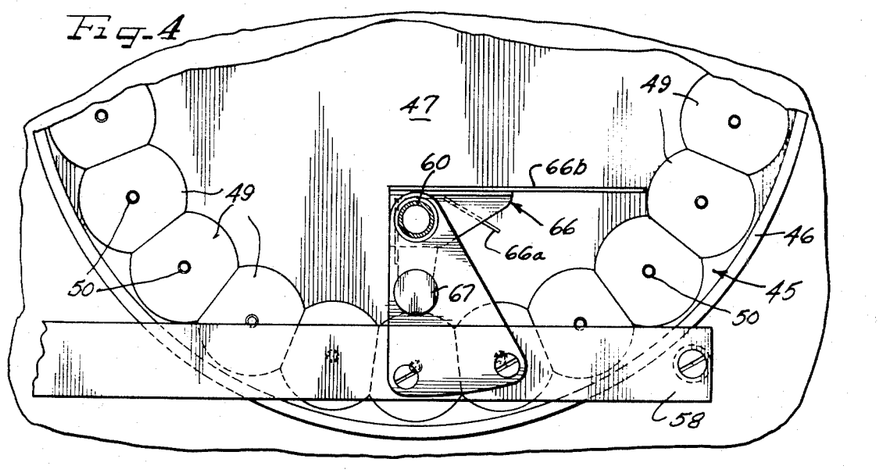
FIG. 4 is a fragmentary plan view, partly in section, of a part of the machine as seen from the line IV—IV in FIG. 2.
Figure 5:
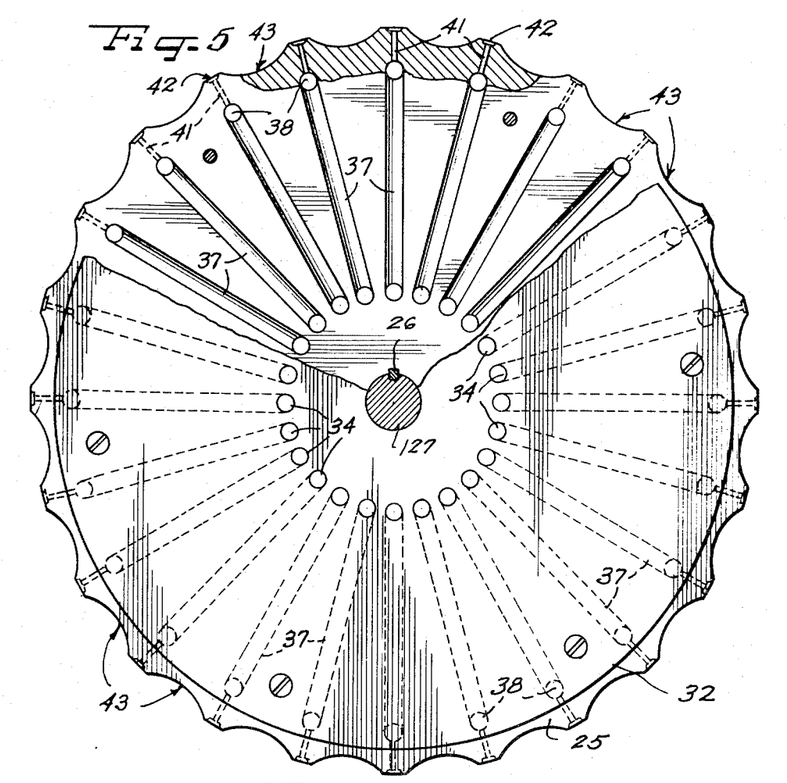
FIG. 5 is a plan view, partly in section and with parts broken away to show interior parts, of a portion of the machine as seen from the line V—V in FIG. 3.
Figure 6:
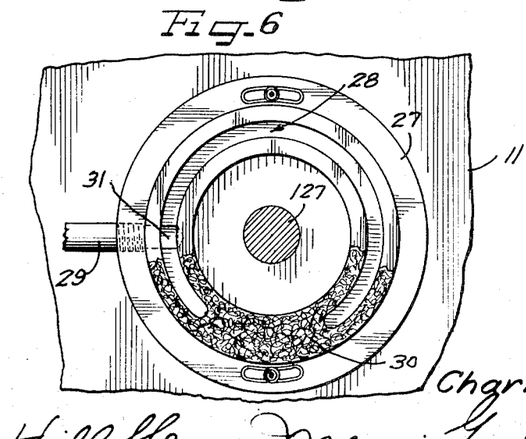
FIG. 6 is a fragmentary plan view, partly in section and with parts broken away to show interior parts, of a portion of the machine as seen from the line VI—VI in FIG. 3.

The filling station 21 which is best depicted in FIGS. 3–5 comprises a drum 25 keyed at 26 to the shaft 127 for rotation thereabout above a vacuum or suction plate 27 mounted atop the base 11. The suction plate 27 is affixed to the base 11 and the drum 25 rotates on a felt gasket 30 affixed to the upper surface of the plate 27. As may best be seen in FIG. 6, the plate 27 has a C-shaped suction passage or groove 28 in its upper surface forming an arc of a circle centered at the shaft 127. A suction pipe 29 is provided with an inlet at 31 into the C-shaped groove 28.

As may best be seen in FIG. 5, the drum 25 is provided with a metal wear plate 32 for abutting against the plate 27 and gasket 30. The plate 32 has a plurality of small diameter vacuum communication openings 34 equally spaced about a circle concentric with the shaft 127 of the same diameter as the C-shaped groove 28 for opening into the groove 28. The openings 34 are each in communication with one of a plurality of radial vacuum communication tunnels 37 which may be horizontal grooves formed in the main body of the drum 25 and covered by the plate 32. These tunnels 37 extend radially from openings 34 and end at a vertical rising access channel 38, which, as may best be seen in FIG. 3, provide vacuum communication via a plurality of smaller diameter channels 41 to a package gripping suction depression 42 formed in the vertical outer surface of the drum 25. The depressions 42 are formed in a flat portion or land of the surface joining adjacent convex cylindrical surface-shaped valleys 43. The perimeter of the drum 25 is made up of these vertically extending circumferentially spaced lands and valleys 43. The spaced lands and valleys 43 are disposed at the annular periphery of the filling station 21 and the strip is guided therearound. The distances between the lands are less than the distances between the transversely spaced heat seals on the strip 13a so that portions of the strip can collapse into the valleys to facilitate filling of the pocket. The lands and valleys are sized so as to receive the strip 13a after it has been formed into a succession of pockets with the vertical seam to be held at 42 and the pocket portion to enter valley 43.

Also forming part of the filling station 21 is a rotating circular table 45 which is keyed to the shaft 127 at its center for rotation with the drum 25 and shaft 127. The table 45 has an outer peripheral lip portion 46 encircling its planar upper surface 47. The table 45 further has a plurality of conical-shaped downward funneling feeds 49 (one for each valley 43 of the drum 25) opening at their bottoms into a tube 50. The feeds 49 and tubes 50 are positioned so as to be directly over the open end 53 (FIG. 3) of a pocket 55 in the strip 13a seated in a valley 43 of the drum 25.

The filling station 21 further comprises a stationary product dispenser 57 mounted on a frame 58 affixed to the base 11. The dispenser 57 includes a hopper 59 for storing and feeding a product, such as granulated sugar, through a tube 60 to the rotating surface 47 of the table 45. A stationary plow 66, including a pair of blades 66a and 66b, cooperates with the rotating table 45 for moving the product into the feeds 49. A cutoff apparatus 67 is provided for pivotal rotation about the shaft 68 for selectively stopping the flow through the tube 60.

In operation, the strip 13a is fed from vertical sealer 19 via various rolls 20 and about an inserting roll 20e (FIG. 1). After the pocket has been fitted into the valley 43, it is opened by means of an air stream from an appropriate source 170 including a tube 171 directing the air stream into the pocket. As the drum 25 and table 45 turn, sugar or the like is drawn out of the hopper 59 through the tube 60 onto the surface 47 where it is moved by the plow 66 blades 66a and 66b into feeds 49. With the machine 10 operating at the proper speed a preselected quantity of material will enter each feed 49. This material falls through the tube 50 into the opening 53 of the individual packages as they travel about with the drum 25. By the time the package and drum have reached the take-off roller adjacent to the top sealer 22, the package has received the proper quantity of the product.

Figure 7:
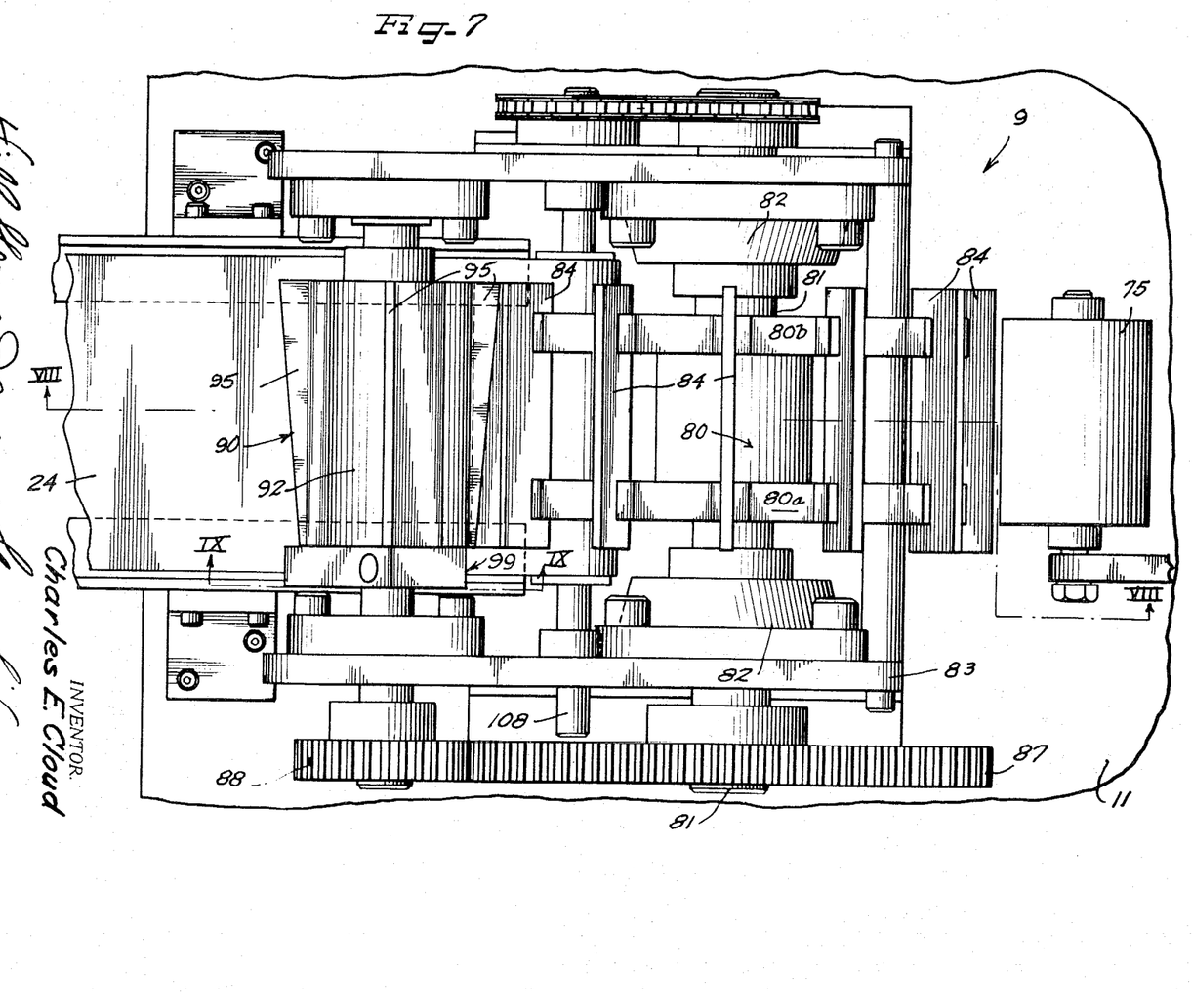
FIG. 7 is a fragmentary enlarged plan top view of part of the machine of FIG. 1.
Figures 8, 9:
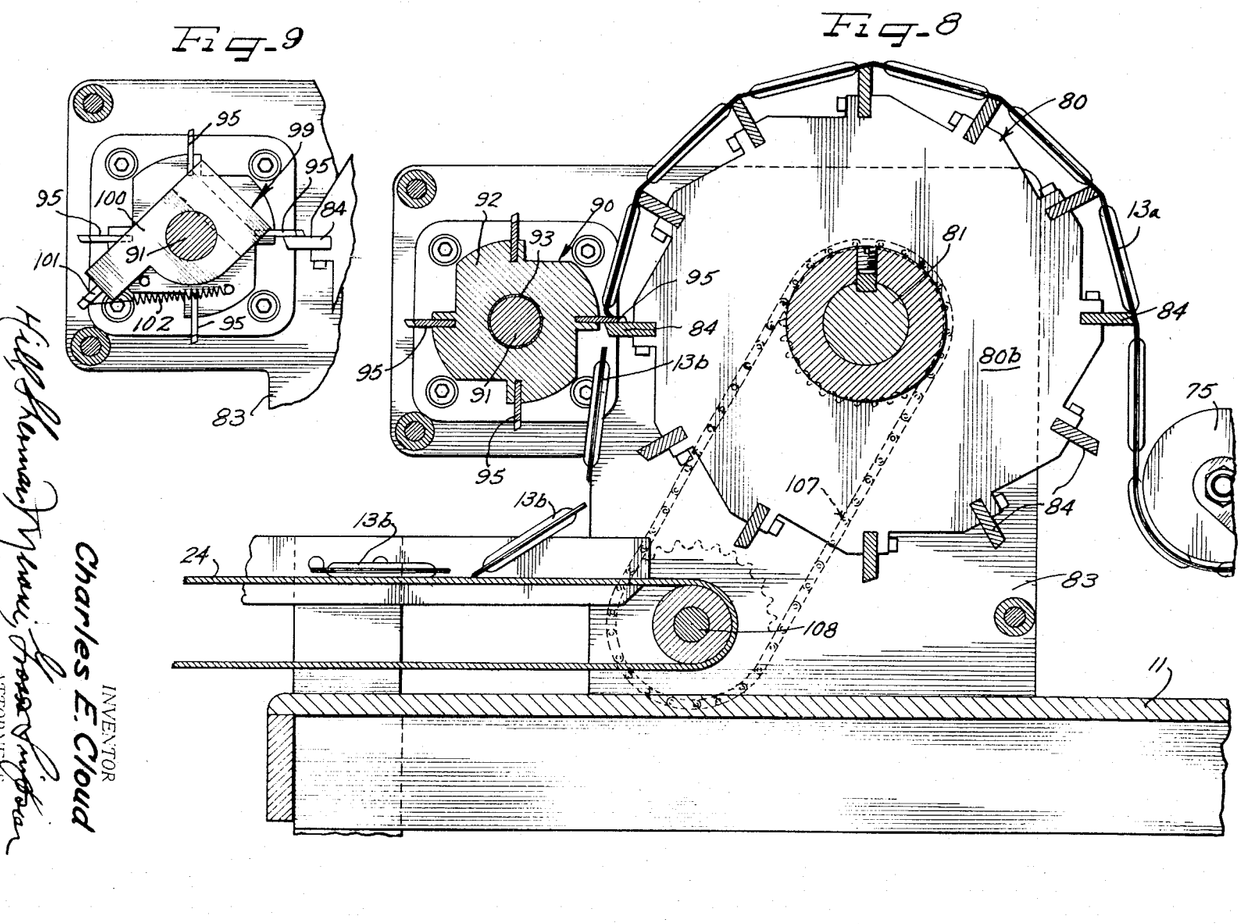
FIG. 8 is a side elevation, partly in section, of part of the machine as seen from the line VIII—VIII in FIG. 7.
FIG. 9 is a side elevation, partly in section, of a part of the machine as seen from the line IX—IX in FIG. 7.

After the pockets of the strip 13a are filled at the filling station 21 they are top-sealed at the sealer 22 and formed into a continuous string of packages and the strip 13a is rotated to a horizontal position to pass under a roller 75 and enter the index-slicer apparatus 9. Referring to FIGS. 7 and 8 there is depicted the detailed apparatus 9 constructed in accordance with one embodiment of the present invention. The apparatus 9 comprises an indexing wheel 80 which rotates about a horizontally mounted shaft 81. The shaft 81 is supported in bearing sleeves 82 mounted on uprights 83 atop the base 11. The wheel 80 comprises a pair of spaced disc-shaped members 80a and 80b for mounting a plurality of rectilinear index bars 84 horizontally therebetween at spaced intervals about their periphery.

At one end the shaft 81 is keyed to a gear 87 which is meshed to a second gear 88 which, in turn, is keyed to and drives a cutting wheel assembly 90. The assembly 90 comprises an axle 91 mounted parallel to the shaft 81 and bears a generally cylindrical member 92 which has a bearing sleeve 93 for rotation about the axle 91. The generally cylindrical member or blade holder 92 has four radially extending horizontal cutting blades as at 95 affixed thereto for coaction with the indexing bars or blades 84 to slice the strip 13a into individual packages 13b along the land-sealed seams.

The free rotating slicer member 92 is driven by means of an actuator 99 which is best depicted in FIG. 9. The actuator 99 comprises a constant speed rotating member 100 which is keyed to the axle 91 for rotation therewith. The index wheel 80 and the rotating slicer 92 are affixed with their axes horizontal and the index wheel is operated at an essentially constant rotational speed while the actuator 99 drives the cutting wheel at a varying speed with a minimum speed being attained at approximately the cutting of the packages by the blades. The member 100 has an extending arm 101 to which is mounted one end of a spiral spring 102. The other end of the spring 102 is affixed to the free rotating slicer 90. As the axle 91 rotates the member 100, the spring 102 maintains the slicer 90 under an increasing bias which, when the slicer blade 95 moves free of the revolving bar 84, causes the slicer 90 to accelerate and swing the next blade 95 into slicing contact with the advanced sealed portion of the next package 13b. In this manner a succession of individual packages are cut from the strip 13a to fall onto the conveyor 24. It will be noted that the blades 95 have cutting edges canted relative to the axis of the slicer 90 and arranged to intermesh with the strip carrying blades 84 for slicing the strip 13a at the transversely spaced heat seals as shown in FIG. 8.

The conveyor belt 24 forms a receiving surface for the severed packages and is driven by means of a chain belt pulley system 107 affixed between one pulley roller 108 and the other end of the shaft 81, thereby to advance the severed packages to a subsequent packing station.

As is now apparent a new and improved packaging machine has been described with improved apparatus for filling and for forming the individual packages from a strip of filled packages.

As illustrated in FIGS. 10 through 13, inclusive, it is contemplated by the present invention to provide a cutting device 200 for severing the packages 13b from the strip 13a and for depositing such packages onto the conveyor belt 24 in a controlled manner. By use of the new features here disclosed in this modification, the packages can be placed on the conveyor belt in a uniform manner so that the packages will not turn relative to one another as the packages are deposited onto the conveyor belt 24.

Figures 10, 11, 12:
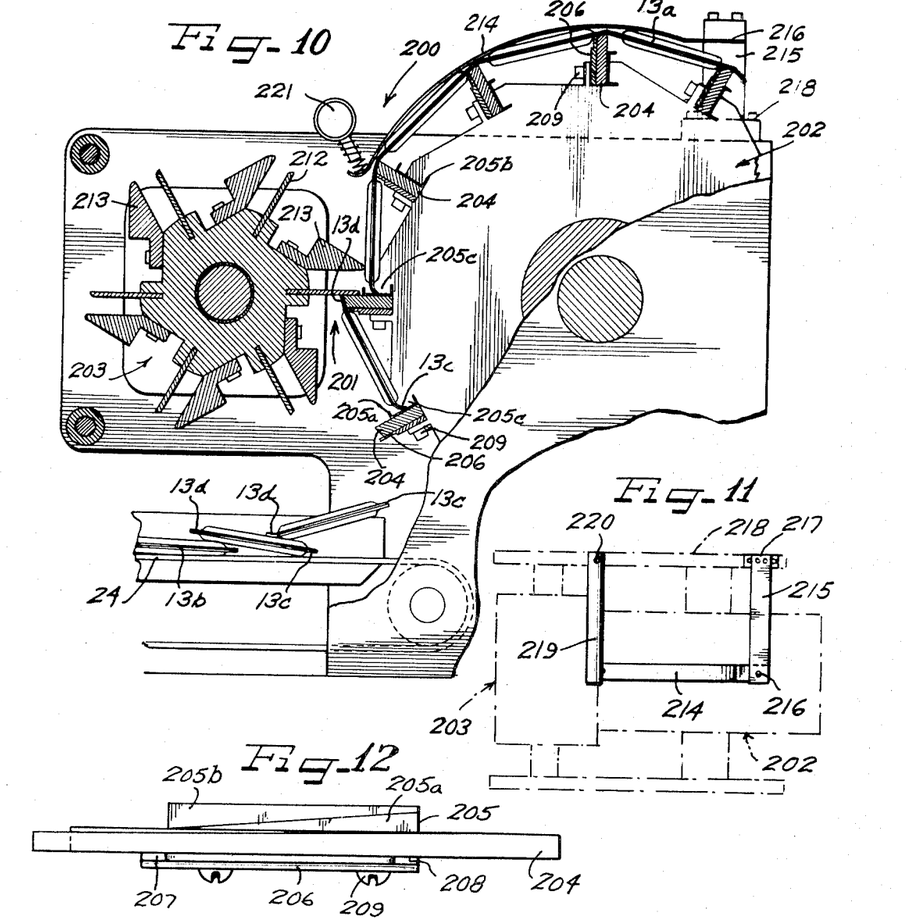
FIG. 10 is a fragmentary side view.
FIG. 11 is a plan view illustrating the machine of FIG. 10 in full and dotted lines.
FIG. 12 is an edge view of the knife.
Figure 13:
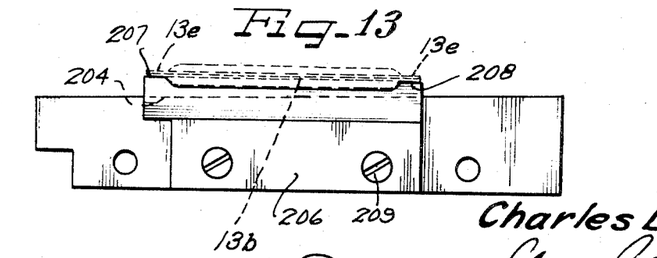
FIG. 13 is a side view of the knife.

In accordance with important features of this modification, after being cut at the cutting zone 201 (FIG. 10), the packages are deposited onto the conveyor belt in such a manner that the packages will not turn relative to one another and so that a first cut edge 13c on each package can be deposited on the conveyor in a position rearward of a second cut edge 13d on the same package. Also, where the packages are printed, the printing on one package can always be identically positioned with respect to the printing on adjacent packages so that the printing on the packages will not be upside down with respect to one another and can be identically oriented in a controlled manner. By selectively varying the speed of the conveyor belt 24, the packages can thus be deposited on the conveyor belt in a shingled manner as illustrated in FIG. 10 so that a packer can then more readily pick up the packages and deposit them into an overwrap container. The packages can virtually be stacked in vertical relation with respect to one another, so as to produce stacks of packages.

The cutting device 200 for severing articles such as the packages 13b from the strip 13a includes a rotating indexing wheel 202 and a ganged rotating slicer 203 which are mounted and operated in much the same manner as the previously described cutting device. The indexing wheel 202 includes a series of knives or blades 204. Mounted on the trailing side of each of the knives or blades 204 is a U-shaped captive channel 205. This channel 205 has a shorter radially outer diagonally edged channel leg or retainer 205a and a longer radially inner channel leg or retainer 205b together defining a captive pocket 205c. Positioned on the leading side of each of the blades is an aluminum spacer plate 206 having marginal pressure points 207 and 208. These components including the blades 204, the channels 205, and the spacer plates 206 are secured to the indexing wheel by means of a series of fasteners such as screws indicated at 209.

The slicer 203 has a series of circumferentially spaced blades 212 and circumferentially positioned between the blades are a series of package pushers 213. As will further be described hereafter, the package pushers 213 serve to push the leading edge 13c ofof the strip 13a into the captive pocket 205c, thereby capturing a free end portion of the strip.

Also mounted on the cutting device is an arcuate strip holddown arm 214. The hold-down arm 214 is supported at one end by means of an arm support 215. The arm support 215 is attached at 216 to the hold-down arm 214 and at 217 to the machine frame 218. A second arm support 219 is provided at an opposite end of the hold-down arm 214. The second arm support 219 is attached at 220 to the machine frame 218. A spring actuated hold-down arm biasing means 221 is carried on the outer end of the support 219 and bears against the leading end of the hold-down arm 214 for biasing the hold-down arm against the filled pouch areas on the strip 13a. The biasing action thereby developed operates to coact with the knife blades 204 to hold the filled pouches in centered relation between the knife blades to prevent slippage of the pouches relative to the indexing wheel during its rotary movement. The biasing means 221 further acts to hold marginal areas of the strip 13a and more particularly the heat-sealed margins of the strip as indicated at 13e–13e against the pressure points 207 and 208 to prevent lateral slippage of the strip 13a relative to the indexing wheel and to the knives. By controlling the position of the filled pouches with respect to the blades, the packages can be severed from the strip in a uniform manner.

As the leading filled pouch is moved into the cutting zone 201, the trailing edge of the package is cut at 13d thus freeing the thus severed package from the strip. During the downward fall of the thus severed package, the leading edge 13c is captured in the pocket 205c to prevent random movement of the package and to enable the trailing edge 13d to be deposited on an underlying surface immediately ahead of the leading edge 13c of the package. The pivotal or rotational movement of the package about the captured leading edge releases the package and permits controlled disposition onto the belt 24. By controlling the speed of the belt 24, the packages can be shingle-stacked or spaced apart or piled in separate stacks as desired.

Excellent results can be obtained by changing the position of the packages 13d with respect to the spacer plate 206 by varying the proportions of either the package or the plate 206 and preferably the proportions of the packages whereby the marginal edges 13e–13 of each package would be totally contained within the depression in the plate 206 between the pressure points 207 and 208.

In accordance with still another embodiment of the present invention, the strip of interconnected, filled packages is directed between a pair of axis-parallel, cooperating cutters having suction-operated gripping or capturing means carried on one of the cutters for capturing and controlling movement of a leading one of the series of interconnected packages and holding that package while and after a trailing sealed land connecting the package to the strip is sliced by engagement of a pair of cutting blades on respective ones of the pair of cutters and then controllably depositing the severed package onto an adjacent conveyor surface so that all packages have a preselected orientation relative to other packages on that conveyor to facilitate subsequent packing of the packages.

As illustrated in FIGS. 14 through 19, inclusive, the cutting means of the last-mentioned embodiment comprises an index wheel 225, a cooperating cutting wheel 226 having a plurality of suction-operated grippers as at 227, and a belt conveyor 228. The indexing wheel 225 is substantially identical to the indexing wheel 80, as illustrated in FIGS. 7 and 8, and generally comprises a pair of spaced, disc-shaped members as at 229 and a plurality of rectilinear index bars as at 231 extending between the disc-shaped members and circumferentially spaced therearound. Each of the rectilinear bars 231 has a beveled, outer end forming a cutting edge as at 246 parallel with an axis of the shaft 232.

Figure 14:
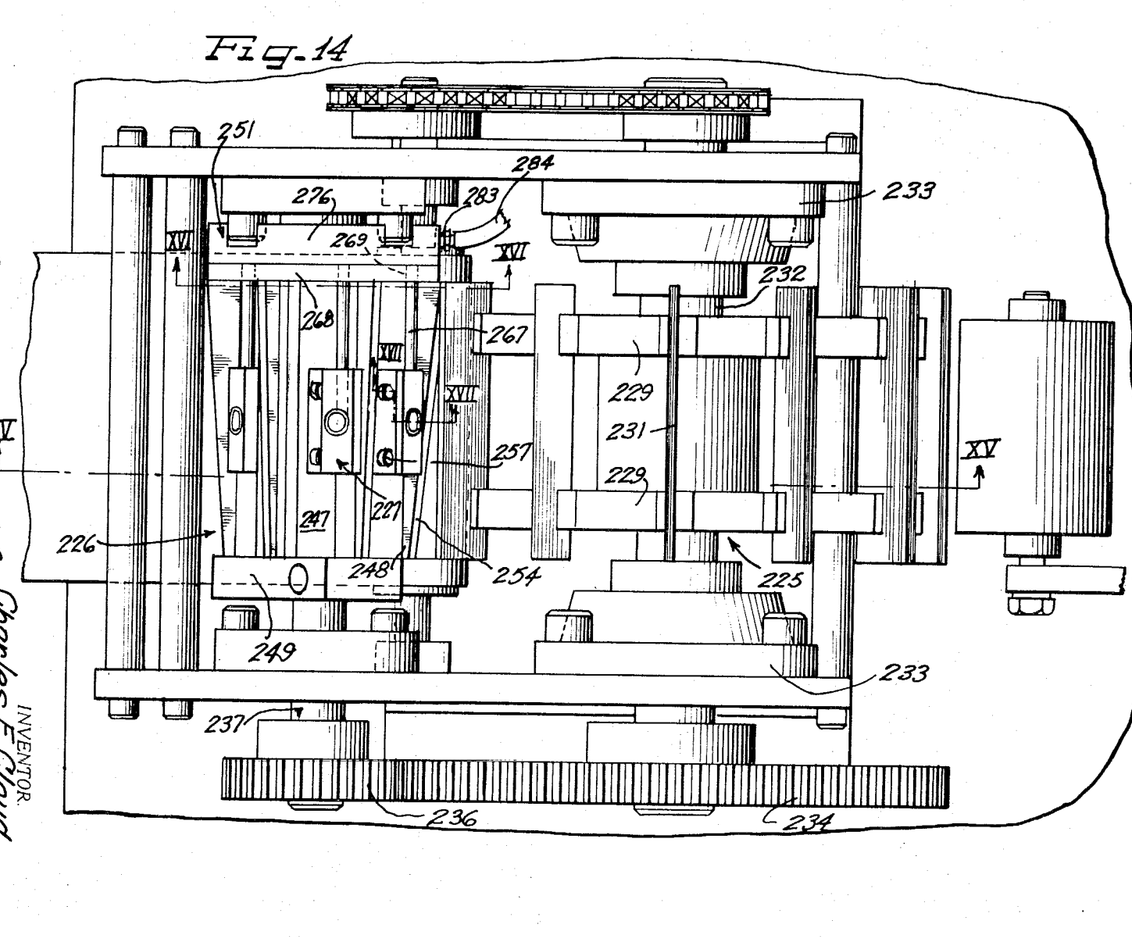
FIG. 14 is a fragmentary enlarged top plan view illustrating an alternate embodiment of a cutting means for the machine of the present invention.

A horizontally disposed shaft 232 passes through appropriately formed apertures in the disc-shaped members 229 and mounts the indexing wheel 225 for corotation with the shaft. A pair of spaced bearing assemblies as at 233 rotatably support opposite end portions of the shaft 232. A gear 234 is keyed to one end portion of the shaft 232 and meshes with a second gear 236 which in turn is keyed to and drives a shaft 237 carrying the cutting wheel assembly 226.

Figure 15:
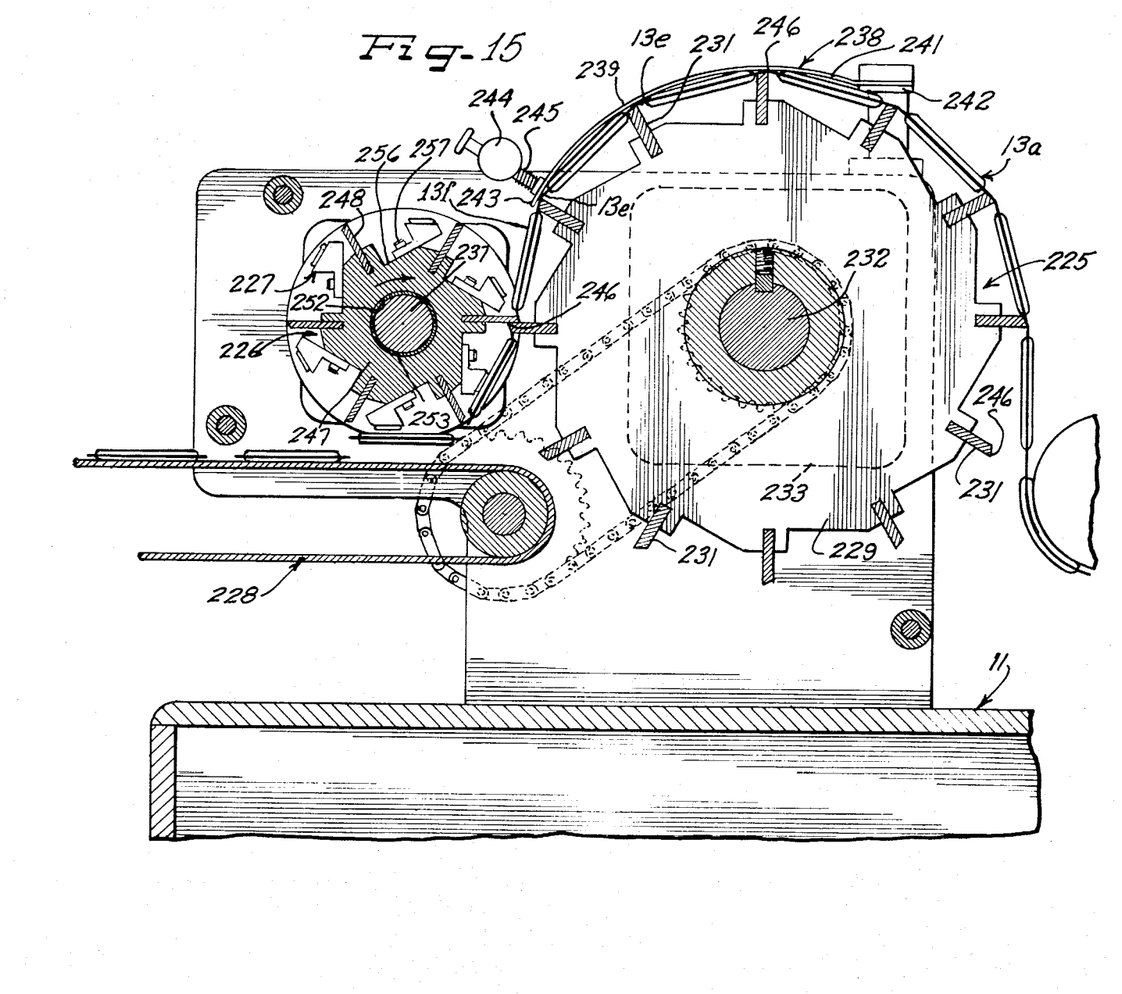
FIG. 15 is a sectional view taken substantially along line XV—XV of FIG. 14.

As best seen in FIG. 15, a hold down assembly 238 having a construction similar to the hold down arm 214 holds the filled packages or pouches centered between the rectilinear bars 231, thereby preventing slippage of the strip relative to the indexing wheel during rotary movement thereof. The hold down assembly includes a flexible hold down arm or strip 239 having one end portion as at 241 clamped in an upstanding support 242 and having an opposite end portion thereof as at 243 spring biased radially inwardly of the indexing wheel 225. The hold down assembly for the spring biased end portion 243 comprises a support member 244 connected to the frame 11 and supporting a spring 245 having a free end portion engaging the hold down strip, thereby to urge the strip inwardly of the index wheel 225 for holding the heat-sealed land areas 13e onto the rectilinear bars 231.

The cutting wheel 226 comprises a substantially cylindrical hub portion 247 carrying the grippers 227, a plurality of radially extending, circumferentially spaced cutting blades as at 248, an actuating device 249, and a selectively operable, switching manifold 251. The hub portion 247 has an axial throughbore 252 characterized by a sleeve bearing 253 having an inside diameter sized to loosely fit over the shaft 237, thereby permitting the hub to freely rotate relative to the shaft. The actuator 249 is substantially identical to the actuator 99 and comprises a constant speed rotating member keyed to the shaft 237 for corotation therewith and for driving the hub at a varying speed with a minimum speed being attained at approximately the cutting of the packages by the blades 231 intermeshing with the blades 248. An outer edge as at 254 of each of the cutting bars or blades 248 is canted relative to an axis of the hub and also is beveled to form a cutting edge which intermeshes with the cutting edges 246 of the rectilinear bars 231 of the index wheel 225, thereby neatly slicing the land areas 13e interconnecting adjacent ones of the packages.

In the example illustrated in the drawings, the cutting wheel 226 includes six equiangularly spaced cutting bars 248 and six grippers 227 equally spaced around the hub 247 and disposed intermediate adjacent ones of the cutter bars. The hub 247 has a plurality of lands as at 256 formed parallel to diametral planes and providing mounting surfaces for the grippers 227. Fasteners as at 257, such as bolts, secure the individual grippers 227 to the hub 247.

Figures 17, 18, 19:
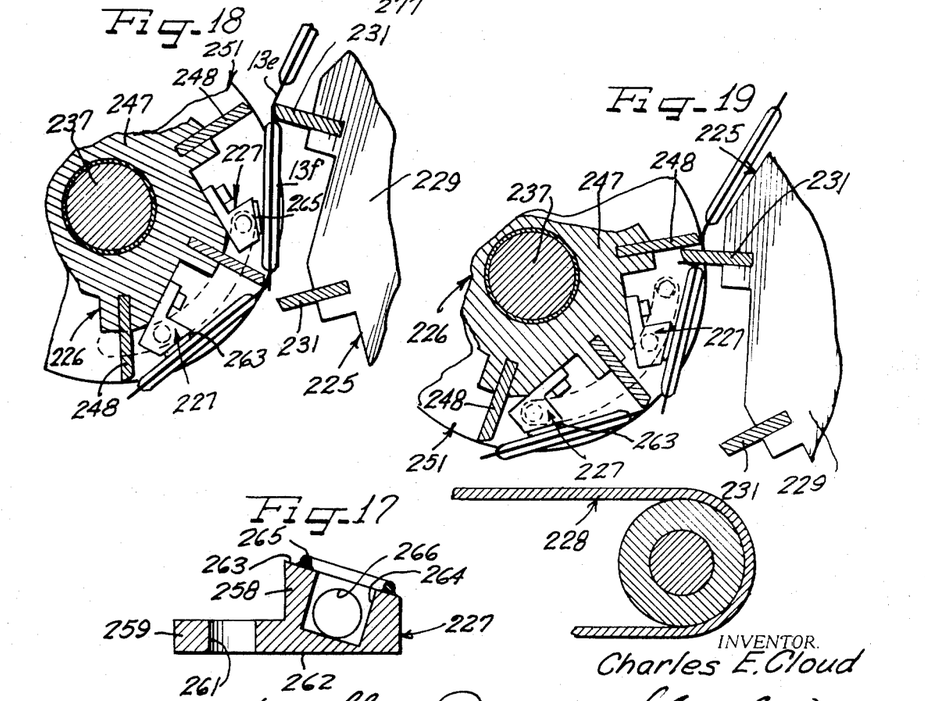
FIG. 17 is an enlarged fragmentary sectional view taken substantially along line XVII—XVII of FIG. 14 and illustrating a package gripping means constructed in accordance with the principles of one embodiment of the present invention.
FIGS. 18 and 19 are side elevational views, partly in section, diagrammatically illustrating a mode of operation of the cutting means illustrated in FIGS. 14 through 17, inclusive.

As best illustrated in FIG. 17, each suction operated gripper 227 comprises a body portion 258 and an offset attachment portion 259 characterized by an aperture 261 sized and disposed to receive the fasteners 257 securing the grippers to the hub 247. The body portion 258 and the attachment portion 259 from a planar base surface 262 which rests on the planar lands 256 of the hub for properly positioning the grippers relative to the hub. A face surface 263 on the body portion 258 of the grippers 227 opposite the base surface 262 is formed obliquely to the base surface in order to come into flat contact with the package. With an arrangement as illustrated in the drawings including six grippers 227, the face surfaces 263 of the grippers are arranged on the sides of a hexagon.

A suction port is provided in each of the grippers 227 by a blind aperture 264 bored inwardly of the face surface 263. A second aperture 266 is bored inwardly from one side of each gripper 277 and intersects the port aperture 264. An O ring 265 surrounds the port aperture 264 and is adhered to the face surface 263 by a suitable adhesive. The O-rings 265 form a seal with the packaging material whenever one of the grippers 227 is moved into engagement with a leading one of the packages on the strip. The intersecting aperture 266 is characterized by a threaded portion receiving a threaded nipple which in turn connects one end of a flexible tube as at 267 (FIG. 14) to each of the grippers 227. An end of each of the flexible tubes 267 opposite the grippers 227 is fitted over a nipple carried in one of a plurality of apertures or passageways as at 269 formed through a plate 268 forming part of the switching manifold 251.

Figure 16:
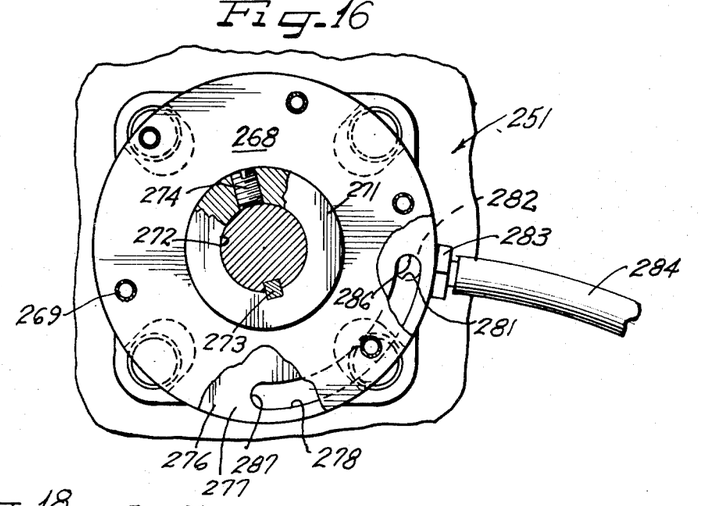
FIG. 16 is a fragmentary, sectional view taken substantially along line XVI—XVI of FIG. 14.

As best illustrated in FIG. 16, the plate member 268 has a hub portion 271 characterized by a throughbore 272 fittingly receiving the shaft 237. The plate 268 is keyed to the shaft as at 273 and held in position by a set screw 274 for corotation with the shaft 237.

In order to selectively connect each of the grippers 227 with a source of suction, the switching manifold 251 includes a second plate member 276 stationarily mounted and having a face surface thereof as at 277 characterized by an arcuate or C-shaped groove 278 and abutting a face surface of the rotating plate 268. The plurality of passageways 269 are arranged about the plate 268 in a circle having a center coincidental with the axis of the shaft 237, and the arcuate groove 278 is centered about the axis of the shaft 237 and radially spaced outwardly therefrom a distance equal to the radius of the circular arrangement of the passageway 269. Thus, as the plate 268 rotates with the shaft 237 each of the passageways 269 are sequentially moved into alignment with the arcuate groove 278, thereby to sequentially connect the grippers 227 to a source of suction or a source of vacuum.

The arcuate groove 278 is continuously connected to a source of suction by a passageway 281 formed transversely and radially through the stationary plate 276 and characterized by a threaded portion as at 282 mounting a hose connection 283 which in turn connects a conduit 284 leading from a suction source to the arcuate groove 278.

An upper end as at 286 of the arcuate groove 278 is positioned so that one of the grippers 227 is connected to the suction or vacuum source as a face surface of that gripper is rotated into adjacency with a leading one of the packages as at 13f, thereby drawing the leading package 13f onto the O-ring 265 to capture and control the movement of the leading package, as illustrated in FIG. 18. Further rotation of the cutting wheel 226 and the index wheel 225 move a set of the cutting bars 231 and 248 into an intermeshing relationship to slice a trailing land area as at 13e connecting the leading package 13f to the strip. During the slicing of the trailing land area 13e suction is continuously drawn through the gripper 227 to maintain the leading package 13f in a captured condition on that gripper. As illustrated in FIG. 19, a lowermost end as at 287 of the arcuate groove 278 is positioned so that the grippers 227 are disconnected from the suction source as the face surface 263 thereof moves into a horizontal plane parallel with, and overlying, the belt conveyor 228. Thus, a severed package which has been captured and controlled by one of the grippers 227 is controllably deposited on the conveyor 228 with a surface thereof disposed outwardly of the cutting wheel 226 facing downwardly on the conveyor 228. In this manner, each package is captured by one of the grippers 227 prior to the same being sliced from the strip, and the captured package is controlled during the slicing operation and deposited on the conveyor 228 in a preselected orientation relative to previously severed packages.

Furthermore, by controlling the speed of the belt conveyor 228 the severed packages may be shingle-stacked, spaced apart, or piled in separate stacks as desired.

Although minor modifications might be suggested by those versed in the art, it should be understood that I wish to embody within the scope of the patent warranted hereon all such modifications as reasonably and properly come within the scope of my contribution to the art.

I claim as my invention:

1. A method of cutting off preprinted packages from a strip comprising the steps of restraining and controlling the movement of the leading edge of the package after it has been severed while the trailing edge of the package is severed and then releasing the leading edge and controlling its placement on an underlying surface so that the printing on each package is identically oriented with respect to the printing on all other packages, and controlling the speed of the underlying surface to "shingle" stack the packages with printing on opposite sides of one package being identically positioned with respect to all other stacked packages.

2. A method of cutting off packages from a strip having spaced filled pouches separated by heat seals comprising the steps of pressing the strip against a first series of traveling knives for holding the pouches centered between the knives while contemporaneously pressing the margins of the strip against marginal pressure points to resist lateral displacement of the pouches, moving a second series of traveling knives sequentially into cooperative package severing association with the first series of traveling knives; restraining the movement of the leading edge of the strip at the leading heat seal while and after the trailing edge of the package is severed at the trailing heat seal and then controlling the release of the leading edge to allow the trailing edge to rotate about the leading edge and be deposited onto an adjacent surface in advance of the leading edge of the same package.

3. A method of cutting pouches from a strip with the strip comprising a length of longitudinally spaced sealed pouches separated by transverse seals comprising the steps of:
training the strip onto annularly arranged bars carried on an indexing wheel and suspending the pouches on the strip at the transverse heat seals from the bars;
causing the strip to be rotated with the bars into adjacency to a slicing wheel and causing knives on the slicing wheel to sequentially engage the bars to sever the strip at the heat seals;
captivating a sliced leading edge of a package in a pocket formed on the bars while a trailing edge of the same package is being sliced; and
controllably releasing the leading edge from the captivating pocket after the trailing edge has been sliced to deposit the package onto a support surface in selected orientation to other packages.

4. A method of cutting pouches from a strip as defined in claim 3, wherein the step of captivating a leading edge in a pocket includes engaging a portion of the slicing wheel against the pouch and pushing the leading edge into the captive pocket.

5. A method of cutting off packages from a strip having spaced filled pouches separated by heat seals comprising the steps of feeding the strip onto a series of traveling annularly arranged elements, moving a series of traveling annularly arranged knives sequentially into cooperative package severing association with the series of traveling elements while controlling the movement of the leading edge of the strip at the leading heat seal by moving the leading edge radially inwardly of the associated element into a captivated position while and after the trailing edge of the package is severed at the trailing heat seal and then releasing the leading edge enabling controlled deposition of the thus severed package onto an adjacent surface.

6. A method of slicing articles from a strip having a series of articles interconnected by land areas, comprising the steps of:
slicing a leading edge of a package;
pushing the leading edge of the package into a capturing pocket after the same has been severed;
retaining the leading edge in the pocket while and after the trailing edge of the package is severed from the strip;
then controlling the release of the restrained, leading edge; and
depositing the package onto an adjacent, underlying surface with one side of each package oriented relative to similar sides of previously severed packages in a preselected manner.

7. A method of cutting off packages from a strip having spaced filled pouches separated by heat seals comprising the steps of pressing longitudinally spaced portions of the strip against a first series of traveling knives for holding the pouches centered relative to the knives, moving a second series of traveling knives sequentially into cooperative package severing association with the first series of traveling knives severing the strip at each of the transverse heat seals to form individual packages, while contemporaneously restraining the movement of the leading edge of the strip at the leading heat seal while and after the trailing edge of the package is severed at the trailing heat seal and then controlling the release of the leading edge to allow the trailing edge to rotate about the leading edge and be deposited onto an adjacent surface in advance of the leading edge of the same package.

8. The method of claim 7 further characterized by said step of restraining the movement of the leading edge including connecting a vacuum source to a port formed on one of the indexing wheel and the cutting wheel for drawing the leading article on the strip into intimate captive engagement with an area surrounding the port.

9. The method of claim 7 further characterized by the step of controlling the releasing of the leading edge after the slicing step including disconnecting the vacuum source from the port in response to the severed article being moved parallel with the underlying, adjacent surface.

10. A method of slicing articles from a strip containing a series of the articles interconnected by land areas, comprising the steps of:
training the strip of interconnected articles around a movable indexing wheel having cutting edges formed on a periphery thereof and circumferentially spaced to engage and carry the land areas;
rotating the indexing wheel to move a leading one of the articles on the strip into adjacency with a cutting wheel having cutting edges formed on a periphery thereof and arranged to intermesh with cutting edges on the indexing wheel to slice trailing land areas interconnecting leading ones of the articles to the strip;
capturing the leading article on one of the indexing wheel and the cutting wheel to control movement of the captured leading article;
slicing the trailing area connecting the captured leading article to the strip to sever the leading article from the strip while continuing to maintain control over movement of the leading article;
controllably releasing the leading article after the slicing step to deposit the severed article onto an underlying, adjacent surface with a side thereof oriented relative to similar sides of previously severed articles in a preselected manner;

said capturing step including pushing a leading edge of the package into a pocket formed on one of the indexing wheel and cutting wheel.

11. A method of slicing articles from a strip containing a series of the articles interconnected by land areas, comprising the steps of:

training the strip of interconnected articles around a movable indexing wheel having cutting edges formed on a periphery thereof and circumferentially spaced to engage and carry the land areas;

rotating the indexing wheel to move a leading one of the articles on the strip into adjacency with a cutting wheel having cutting edges formed on a periphery thereof and arranged to intermesh with cutting edges on the indexing wheel to slice trailing land areas interconnecting leading ones of the articles to the strip;

capturing the leading article on one of the indexing wheel and the cutting wheel to control movement of the captured leading article;

slicing the trailing area connecting the captured leading article to the strip to sever the leading article from the strip while continuing to maintain control over movement of the leading article;

controllably releasing the leading article after the slicing step to deposit the severed article onto an underlying, adjacent surface with a side thereof oriented relative to similar sides of previously severed articles in a preselected manner; and controlling the release of the severed article including permitting the sliced, trailing edge of the leading package to gravitationally pivot about the captivated leading edge and engage the underlying, adjacent surface in advance of the trailing edge.

12. A method of severing a continuous strip of interconnected preprinted packages comprising the steps of:

moving the strip of interconnected packages into cutting relationship with a pair of cooperative, rotating cutters;

controlling the vertical movement of the leading one of the packages on the strip during and after a trailing edge of the leading package is cut to control its placement on an underlying conveyor so that the printing on each package is identically oriented with respect to the printing on all other packages, said controlling step comprising connecting a vacuum source to a port formed on one of said cooperative cutters for drawing the leading package into intimate captive engagement with an area surrounding the port, and disconnecting the vacuum source from the port when the captivated package has moved with said rotating cutter to a position to be deposited flat onto an underlying surface.

13. A method of severing a continuous strip of interconnected preprinted packages comprising the steps of:

moving the strip of interconnected packages into cutting relationship with a pair of cooperative, rotating cutters;

controlling the vertical movement of the leading one of the packages on the strip during and after a trailing edge of the leading package is cut to control its placement on an underlying conveyor so that the printing on each package is identically oriented with respect to the printing on all other packages, said controlling step comprising connecting a vacuum source to a port formed on one of said cooperative cutters for drawing the leading package into intimate captive engagement with an area surrounding the port, disconnecting the vacuum source from the port when the captivated package has moved with said rotating cutter to a position to be deposited flat onto an underlying surface, and controlling the speed of an underlying surface to "shingle" stack the packages in identical relation with respect to one another so the printing on opposite sides of one package is identically positioned on all other stacked packages.

14. A method of cutting off preprinted packages from a strip comprising the steps of restraining and controlling the movement of the leading edge of the package after it has been severed while the trailing edge of the package is severed and then releasing the leading edge of each severed package and controlling its placement on an underlying surface so that the printing on each package is identically oriented with respect to the printing on all other packages to facilitate cartoning of the printed packages so that the printing on all of them can be uniformly oriented.

* * * * *